Sept. 9, 1952          O. R. HAAS          2,609,891
LUBRICATING APPARATUS
Filed April 30, 1948
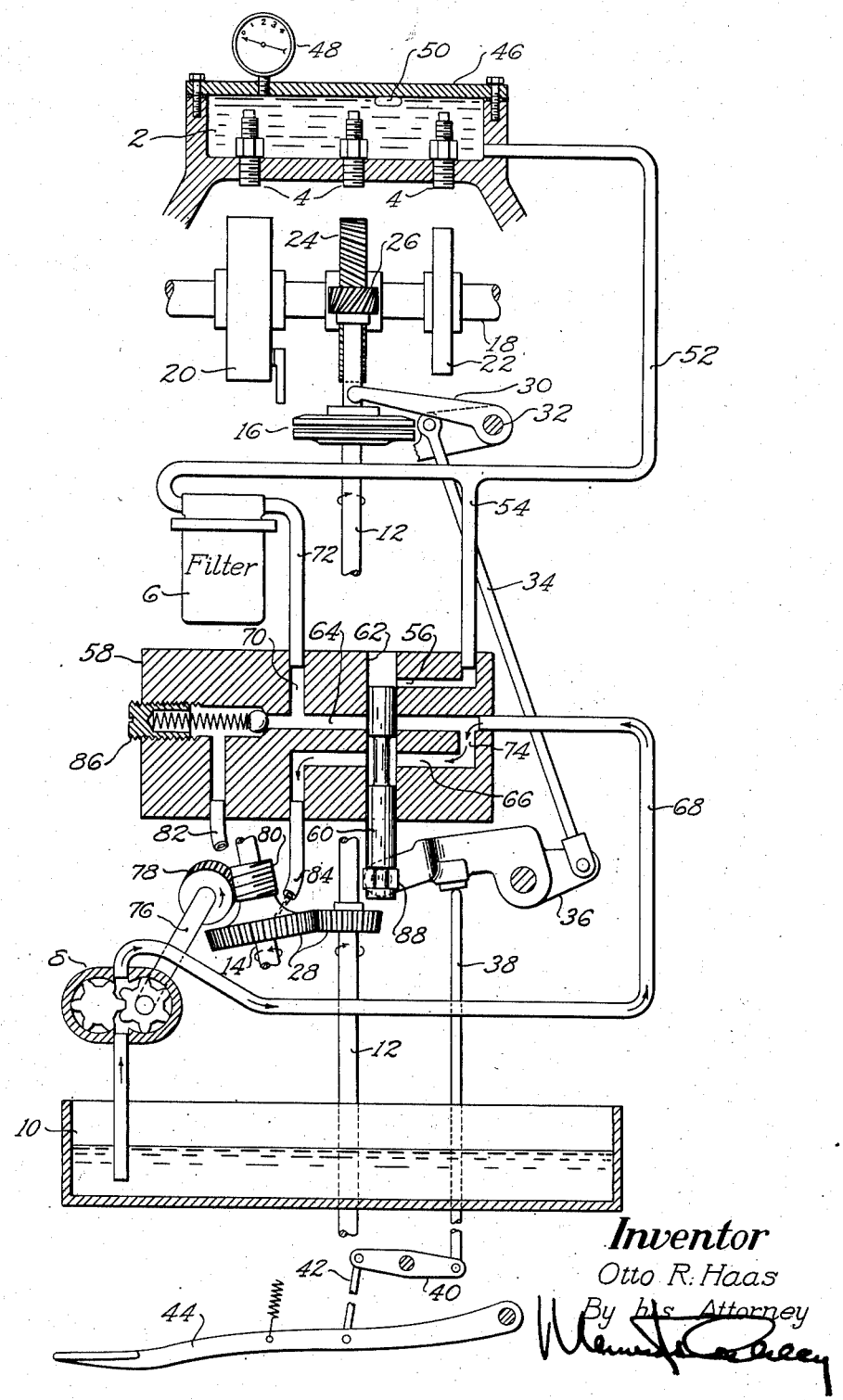
Inventor
Otto R. Haas
By his Attorney Patented Sept. 9, 1952

2,609,891

UNITED STATES PATENT OFFICE 2,609,891

LUBRICATING APPARATUS

Otto R. Haas, Wenham, Mass., assignor to United Shoe Machinery Corporation, Flemington, N. J., a corporation of New Jersey Application April 30, 1948, Serial No. 24,122

6 Claims. (Cl. 184—6)

The present invention relates to automatic lubrication of machine parts and more particularly to improvements in the lubrication of machines in which minute quantities only of lubricant are metered and delivered to the respective parts, any excess of lubricant tending to flood the machine or damage the work being operated upon. As hereinafter described, one construction of lubricating apparatus is arranged with a reservoir within which a plurality of flow restrictive nozzles are mounted, each nozzle being calibrated to admit under uniform pressure a few drops of lubricant per hour.

In an application for United States Letters Patent Serial No. 19,716, filed April 8, 1948, in the name of Percy White there is disclosed apparatus for automatically lubricating the operating parts of a machine periodically by volumetric measurement. This type of apparatus differs from the present type in which lubricant under pressure is metered continuously by nozzles having flow restrictive orifices of a size selected in accordance with the lubrication requirements of the respective parts. Where lubricant is delivered under a uniform pressure a continuous flow is easily maintained but to avoid variation in flow as a result of clogging it is necessary to employ an extremely fine mesh filter in the supply line for the metering nozzles. If a machine is frequently started and stopped it is also desirable to discontinue flow of lubricant from the nozzles during the times the machine is stopped, but it is difficult to cut off the flow of lubricant instantaneously from the nozzles merely by stopping the supply. This is because most lubricants are readily compressible and merely stopping the supply to the nozzles does not relieve the pressure for some time because the leakage through the nozzles is insufficient to reduce the compression of the lubricant effectively. Furthermore, this difficulty is accentuated by the presence of air bubbles entrapped within the lubricating system. The compressibility of the air bubbles adds to the compressibility of the fluid in the system to further delay the pressure relief on the metering nozzles. The weight of the lubricant above the level of the nozzles also tends to cause gradual seepage through the nozzles by gravity even after the compression is fully relieved.

The principal object of the present invention is to provide a metering nozzle type lubricating apparatus in which the difficulties enumerated are avoided and by which the flow of lubricant to each part may instantaneously be cut off whenever the machine to which the apparatus is applied is brought to rest without seepage or delay in pressure relief on the nozzles.

Another object is to provide a metering type lubricating apparatus arranged to prevent flow of lubricant through a restrictive nozzle either by gravity or by other causes when it is desired to cut off the flow.

The apparatus embodying the present invention is arranged to be applied to a machine having an operating part, driving means such as a clutch for starting and stopping said part, a control member for the driving means, a reservoir for lubricant connected to a series of flow restrictive nozzles for lubricating the part, and means for supplying pressure to the lubricant in the reservoir, in which there is provided a valve operatively connected to the control member having ports and lubricant connections for venting the pressure in the reservoir when the driving means is rendered inoperative, thus immediately preventing further flow of lubricant through the nozzle.

In accordance with this feature of the invention the venting is accomplished by a two-way valve in one position of which the lubricant is supplied under pressure to the reservoir when the driving means is rendered operative and in the other position of which the supply is stopped and the pressure vented. To prevent clogging of the nozzle a fine mesh filter is employed, and in this form of the embodiment, the valve supplies lubricant indirectly to the reservoir through the filter, the reservoir vent by-passing the filter.

The machine to which the present apparatus is applied is provided with driving means including a main shaft, a countershaft and driving gears therebetween. To lubricate the driving gears, according to a further feature of the invention, one of the venting outlets is directed against the gears. As illustrated, an excess pressure relief valve is provided to discharge lubricant while the machine is running and is arranged with a second outlet also directed against the driving gears so that these gears receive lubricant both while the machine is at rest and while running.

These and other features of the invention consist in the devices, combinations and arrangements of parts hereinafter described and claimed which, together with the advantages to be obtained thereby, will readily be understood from the following description taken in connection with the accompanying drawing in which, The single figure is a diagrammatic illustration of the lubricant metering apparatus embodying the features of the present invention.

The apparatus in the drawing is illustrated as being applied to a shoe inseam sewing machine similar to that disclosed in United States Letters Patent No. 2,041,945, granted May 26, 1936 upon application of Alfred R. Morrill and comprises a shallow lubricant reservoir 2 formed in the frame of the machine, in the bottom of which reservoir are a series of openings threaded to receive flow restrictive nozzles 4, a fine mesh filter 6 through which lubricant under pressure is supplied to the reservoir and a continuously driven lubricant pump 8 acting to draw the lubricant from a sump 10 and supply it under suitable pressure to the filter. The nozzles are located directly above the operating parts of the machine and are constructed to pass minute quantities of lubricant at rates of from one to twenty drops an hour.

For operating the machine it is provided with a main vertical drive shaft 12, a countershaft 14 and a main driving clutch 16 mounted at the upper end of the drive shaft 12. The operating parts of the machine include a horizontal sewing shaft 18, cams 20 and 22 and a helical gear 24 driven by a similar gear 26. To drive the operating parts the gear 26 is connected for rotation by the clutch 16 with the drive shaft 12. The main drive and countershafts 12 and 14 are rotated together by gears 28 and are driven continuously by a suitable source of power (not shown).

To control the clutch 16, connections are provided, as more fully described in the said patent, including a clutch operating member 30 secured to a pivot shaft 32, a rod 34 connected between the clutch actuating member and a lever 36 fulcrumed on the frame of the machine. The lever 36 is engaged by the upper end of a rod 38 pivoted at its lower end to a lever 40 connected in turn through a link 42 with a foot treadle lever 44. The arrangement is such that when the treadle is depressed the clutch control member 30 causes the clutch to be engaged and when the treadle is released the clutch is disengaged and rendered inoperative to drive the machine.

To enable the reservoir 2 to be supplied with the lubricant under pressure so that the lubricant will be forced through the nozzles 4 onto the operating parts of the machine, the upper rim of the reservoir has clamped to it a cover 46 hermetically sealed therewith and the cover has a threaded opening within which is mounted a pressure gage 48.

In the present apparatus as originally constructed, the pump was directly connected to the filter so that a constant supply of lubricant was furnished to the reservoir and the nozzles 4, causing continuous lubrication of the operating parts of the machine to which it was applied whether the sewing shaft was rotated or not. It was found, however, that often times excess lubricant was accumulated on the operating parts of the machine while stationary if the clutch 16 was left disengaged for a substantial period of time. When the machine was restarted the excess accumulations were then thrown off in such a way as to soil the work and require special attention to maintain the outer surfaces of the machine frame free of lubricant. To overcome this difficulty it was then proposed to provide a valve operatively connected to the control member 30 and actuated to supply lubricant to the reservoir only when the clutch 16 was engaged and to stop the supply when the clutch was disengaged. The use of such valve alone, however, was found inadequate since the lubricant was compressed within the reservoir 2, and merely stopping the supply to the reservoir did not reduce the pressure sufficiently to prevent excess accumulations on the machine parts. This condition was aggravated by the presence of air bubbles, indicated at 50, frequently found in the reservoir, the air bubbles adding substantially to the compressibility of the fluid within the reservoir and to the delay of pressure relief.

It is thus apparent with the use of nozzles 4 which admit flow of lubricant at the rate of a few drops an hour, that merely stopping the supply of lubricant to the reservoir will cause pressure reduction only after a substantial amount of lubricant has passed through the nozzles and allowed to form undesirable accumulations. The use of the filter 6 further accentuates the difficulty by retarding prompt pressure relief through the filter in a direction reverse to that of the usual flow.

To insure that the flow of lubricant through the nozzles 4 will be cut off instantaneously whenever the clutch 16 is disengaged, according to the present invention, the reservoir 2 is vented to the atmosphere whenever the supply of lubricant is stopped. For this purpose the reservoir is connected with the filter 6 by a tube 52 which is joined through a T connection 54 with a part 56 in a two-way valve comprising a body 58 and a cylindrical slide 60 within a vertical bore 62 in the body 58. The slide 60 is operatively connected to the clutch control member 30 and is arranged to cover or uncover the part 56 which is vented through the upper end of the bore 62 when the port is uncovered.

The valve also acts to supply and stop the flow of lubricant from the filter. For this purpose the slide 60 has a reduced mid-section and parallel passages 64 and 66 in the body of the valve intersect the bore 62. The passage 64 connects a pressure supply tube 68 running from the pump 8 to the filter 6 when the valve slide is raised, the filter being connected to the passage 64 through a vertical passage 70 into which is fitted a tube 72 connected with the filter. When the valve slide is lowered the supply is stopped and the filter disconnected from the pump.

To vent the flow of lubricant from the pump after the supply to the filter is stopped so that the pump may continue to run, the passage 66 is connected by a short vertical passage 74 to the supply passage 64. The passage 66 intersects the bore 62 through venting ports which are covered and uncovered by the slide 60. When the valve slide is lowered a supply passage 64 is stopped and the vent passage 66 opened by a reduced section of the slide, as shown in the drawing. Thus, the lubricating system is vented at two points at the same time.

It will be noted that the slide is so proportioned and the length of the reduced section is such that the ports in the vent passage 66 will be opened before those of the supply passage 64 are completely closed by the upper end of the slide. Thus, there is an overlap in the opening of these ports. Accordingly, excessive pressures are avoided in the supply tube 68 from the pump and the lubricant supply is stopped gradually rather than abruptly as the slide is lowered. Furthermore, the vent port 56 in the bore 62 is located to be uncovered at the extreme lower end of the slide stroke so that the reservoir is vented only when the treadle 44 is moved definitely to a stopping position. For this reason unnecessary pressure fluctuations within the reservoir pipe 52 will be avoided. Also because the ports in the supply passage 64 are closed after the venting port 56 is opened there will be no tendency to reverse the flow of lubricant through the filter as a result of back pressure in the reservoir. In this way the filter is maintained in a better operating condition since deposits of foreign material will be retained in fixed position on the filtering medium without frequent displacement.

The pump 8 is driven through a pump shaft 76, a worm gear 78 on the shaft and a worm 80 on the countershaft 14. The worm and gear 78, 80 for the pump, and gears 28 for the countershaft are lubricated continuously through one of two outlets 82 and 84 whether the operating parts of the machine are actuated or not. The vent outlet 84 is in the form of a tube with its lower end directed toward the gear 28 on the countershaft 14 and its upper end is connected with the vent passage 66. When the sewing shaft 18 is at rest the gears are lubricated by the vent outlet 84. As soon as the clutch is engaged to start the sewing shaft the vent passage 66 is closed and the supply passage 64 opened. As soon as the supply passage 64 is opened lubricant is directed against the gears through the outlet 82 in the form of a tube extending downwardly from a pressure relief valve 86 connected with the supply passage 64. The flow of lubricant through the filter and the nozzles 4 is extremely small as compared to the capacity of the pump 8 so that the greater portion of the lubricant is vented through the pressure relief valve and the outlet 82 against the gears. Some of the lubricant not used by the operating parts 20, 22 and 24 also finds its way downwardly onto the gears and eventually into the sump 10.

To connect the valve slide 60 with the control member 30 the lever 36 has a lateral extension formed with a perforation within which is pivotally mounted a slotted block 88. The slotted portion of the block 88 surrounds a reduced portion near the lower end of the slide between the body of the slide and a head at its lower end provided to confine the relative vertical movements of the block on the slide.

The construction and arrangement of the lubricating apparatus of the invention is particularly adapted for a machine requiring continuous lubrication with minute quantities of lubricant while a machine is running, in which the application of lubricant is immediately cut off when the machine is brought to rest. This result is obtained by accurately metering the flow of lubricant through orifices in the nozzles under a constant pressure.

To insure effective constant pressure regulation, the pump 8 is made to provide a volume of flow several hundred times greater than the quantity metered through the nozzles 4. By so doing, the size of the pump is made adequate to cause leakage in the system to be ineffective in reducing the pressure. To the extent that the pressure is kept uniform, the lubrication is maintained at the desired rate. The pressure applied through the supply tubing and vented through the relief valve ordinarily never exceeds four pounds, at which pressure the nozzles 4 provide a reliable metering action.

In order to prevent positively any seepage through the nozzles as a result of a gravity head in the lubricant above the nozzles while the operating parts are at rest, the tube 52 enters the reservoir 2 as close as possible to the bottom and the venting port 56 is located approximately a foot below the reservoir. With this arrangement the venting action of the port 56 actually applies a slight degree of suction to the reservoir, as indicated by the gage 48, offsetting any possible effect of gravity head above the nozzles and avoiding any possibility of flow through the nozzles when the operating parts of the machine are at rest. The tube 52 and the port 56 thus provide a source of suction when the port is opened.

While the illustrated machine is provided with a reservoir 2 of substantial size in which a comparatively large quantity of lubricant is stored, such a reservoir is not essential to the effective operation of the apparatus, particularly when a single metering nozzle only is required. In some instances it is sufficient only to run a supply tube directly between the filter and the nozzle, the storage capacity of the tube providing adequate supply of lubricant to the nozzle each time the pressure is applied.

The nature and scope of the invention having been indicated and a particular embodiment having been described, what is claimed is:

1. An apparatus for metering lubricant to an operating machine part, driving means for which is rendered operative and inoperative by a control member, having a reservoir for the lubricant, means for supplying pressure to the lubricant, a restrictive nozzle connected to the reservoir for delivering a minute quantity of lubricant to the operating part and a filter through which lubricant is supplied to the reservoir, in combination with a two-way valve operatively connected to the control member having ports and lubricant connections for supplying lubricant under pressure from the pressure supplying means to the filter when the driving means is rendered operative and for venting the reservoir between the filter and the reservoir when the driving means is rendered inoperative.

2. An apparatus for metering lubricant to an operating machine part, driving means for which is rendered operative and inoperative by a control member, having a shallow reservoir for lubricant, means for supplying pressure to the lubricant, a restrictive nozzle in the bottom of the reservoir for delivering a minute quantity of lubricant to the operating part, and a hermetically sealed cover plate for the reservoir to enable pressure to be applied to the nozzle, in combination with a valve operatively connected to the control member having ports and lubricant connections for supplying lubricant under pressure to the reservoir when the driving means is rendered operative and provided with a port for venting the reservoir located at a substantially lower level than the reservoir to apply suction to the nozzle when the driving means is rendered inoperative.

3. An apparatus for metering lubricant to an operating machine part, driving means for which is rendered operative and inoperative by a control member, having a restrictive nozzle for delivering a minute quantity of lubricant to the operating part of the machine, a filter for the lubricant before it passes through the nozzle and a continuously driven lubricant pump, in combination with a valve having ports and lubricant connections to vent the pressure at two points, between the filter and the nozzle and between the pump and the filter.

4. An apparatus for metering lubricant to an operating machine part, driving means for which includes a drive shaft, a countershaft, gears between said shafts, a clutch, and a control member for the clutch, having a lubricant pump driven from the driving means, a restrictive nozzle for delivering a minute quantity of lubricant to the operating part of the machine and a filter for the lubricant before it passes through the nozzle, in combination with a valve having a slide, ports and lubricant connections to vent the lubricant between the filter and the nozzle and between the pump and the filter, and an outlet connection for one of the venting ports of the valve directed against said gears.

5. An apparatus for metering lubricant to an operating machine part, driving means for which includes a drive shaft, a countershaft, gears between said shafts, a clutch, and a control member for the clutch, having a lubricant pump driven from the driving means, a restrictive nozzle for delivering a minute quantity of lubricant to the operating part of the machine and a filter for the lubricant before it passes through the nozzle, in combination with a valve having a slide, ports and lubricant connections to vent the lubricant between the filter and the nozzle and between the pump and the filter, an outlet connection for one of the venting ports of the valve directed against said gears, and a pressure relief valve for the lubricant between the pump and the filter.

6. An apparatus for metering lubricant to an operating machine part, driving means for which includes a drive shaft, a countershaft, gears between said shafts, a clutch, and a control member for the clutch, having a lubricant pump driven from the driving means, a restrictive nozzle for delivering a minute quantity of lubricant to the operating part of the machine and a filter for the lubricant before it passes through the nozzle, in combination with a valve having a slide, ports and lubricant connections to vent the lubricant between the filter and the nozzle and between the pump and the filter, an outlet connection for one of the venting ports directed against said gears, and a pressure relief valve connected between the pump and the filter having an outlet connection directed against said gears to provide lubricant when the venting ports are closed.

OTTO R. HAAS.

REFERENCES CITED

The following references are of record in the file of this patent:

UNITED STATES PATENTS

| Number | Name | Date |
| --- | --- | --- |
| 1,201,038 | Green | Oct. 10, 1916 |
| 1,209,851 | Koch | Dec. 29, 1916 |
| 1,632,775 | Bijur | June 14, 1927 |
| 1,723,945 | McCutcheon | Aug. 6, 1929 |
| 1,953,824 | Blanchard | Apr. 3, 1934 |
| 2,195,209 | Gieskieng | Mar. 26, 1940 |
| 2,229,655 | Kocher | Jan. 28, 1941 |

FOREIGN PATENTS

| Number | Country | Date |
| --- | --- | --- |
| 343,552 | Germany | Nov. 3, 1921 |